March 17, 1953 E. V. CARLSON 2,631,858
PHONOGRAPH STYLUS
Filed Dec. 20, 1948

INVENTOR.
Elmer V. Carlson
BY. Thiess, Olson & Mecklenburger
Att'ys

Patented Mar. 17, 1953 2,631,858

UNITED STATES PATENT OFFICE 2,631,858

PHONOGRAPH STYLUS

Elmer V. Carlson, Chicago, Ill., assignor to Shure Brothers, Incorporated, Chicago, Ill., a corporation of Illinois Application December 20, 1948, Serial No. 66,168

2 Claims. (Cl. 274—38)

This invention relates to phonograph translating or pickup devices, more particularly to double-ended styluses for use in two-sided pickups which are to play the top sides of records as well as the bottom sides thereof without turning the records over, and it is an object of the invention to provide an improved stylus of this character.

Phonographs include a turntable, and off to one side thereof a tone arm is pivoted which extends over a phonograph record on the turntable so that a needle or stylus held in the tone arm runs in the record grooves.

In well-known two-sided pickups and double-ended styluses the bottom of the stylus ordinarily projects forwardly and the top end of the stylus ordinarily projects rearwardly of the point of attachment to the tone arm. This arrangement in automatic record changers, wherein both sides of records are to be played without turning the records over, results in the stylus engaging the top side of a record at one point and the bottom of a record at a different point relative to the turntable center. This is disadvantageous in automatic record changers, since if the tone arm manipulating apparatus is adjusted so that the lower or forward end of the stylus engages the initial or starting groove of the top side of a record on beginning to play, the top end of the stylus will engage the bottom side of a record several grooves inwardly or it will engage the bottom side of a record outwardly of the initial groove depending on the particular construction. In some instances such a construction would result in a record starting to play after the recording thereon has begun, and in others where the margin at the edge of the record is small, the stylus may miss the record altogether. To construct an automatic record changer so that the tone arm moves to one position relative to the turntable center for playing the top of a record, and moves to a different position relative to the turntable center for playing the bottom of a record would result in a complicated and expensive mechanism.

Accordingly, it is a further object of the invention to provide an improved double-ended stylus which, when placed in the tone arm of a record changer, will begin the top and bottom sides of records at substantially the same point relative to the turntable center.

The stylus of a pickup makes an angle with the tangent to the record grooves at the point of engagement, which angle may be referred to as the tracking angle and in an ideal case the tracking angle would be zero for all positions of the needle during the playing of a record. In actual cases the tracking angle is not zero and, moreover, it varies as the tone arm moves across the record, the tone arm being constructed so that the stylus engages the record at substantially the optimum point. In double-ended styluses and tone arms therefor where the top end of the stylus lies behind or ahead of the bottom end, one end or the other will not engage the record at the optimum point if the other end of the stylus does so.

Accordingly, it is a further object of the invention to provide an improved stylus for use in apparatus capable of playing the top and bottom sides of records without turning the records over wherein the stylus contacts each side of a record at substantially the optimum point.

In carrying out the invention in one form, a double-ended stylus for a phonograph pickup is provided comprising a pair of record engaging points opposite each other and lying on a line substantially perpendicular to the records engaged thereby.

For a more complete understanding of the invention, reference should be had to the accompanying drawings in which.

Figure 1:
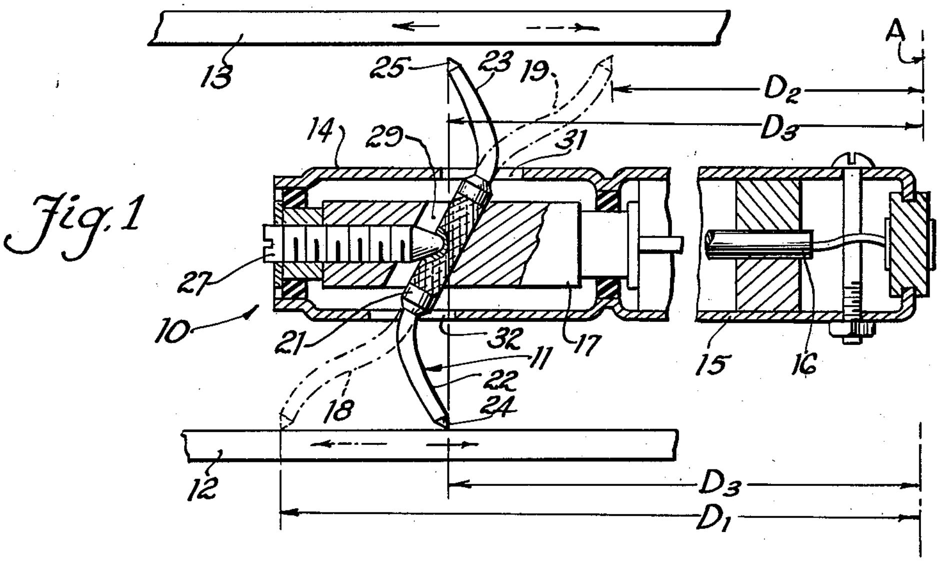
Figure 1 is a sectional view somewhat diagrammatic of phonograph pickup apparatus embodying the invention.

Referring to Fig. 1, the invention is shown embodied in a pickup 10 including a double-ended stylus 11 adapted to engage phonograph records 12 and 13. The pickup proper includes a pair of half shells 14 and 15 forming a complete casing and supporting a translating element, such, for example, as a crystal 16 inside thereof together with a torsion member 17 resiliently supported by the casing members also. The torsion member is adapted to tightly hold stylus 11 and is connected to the crystal 16, as is well understood, in order that movements of the stylus are transmitted to the crystal for producing an output from the pickup. The two-sided pickup as shown in Fig. 1, and a stylus including members 18 and 19 shown in dotted lines, are more completely disclosed and claimed in a copending application entitled "Two Sided Pickup and Stylus Therefor," Benjamin B. Bauer, Serial No. 777,284, filed October 1, 1947, and assigned to the same assignee as the present invention.

Figure 2:
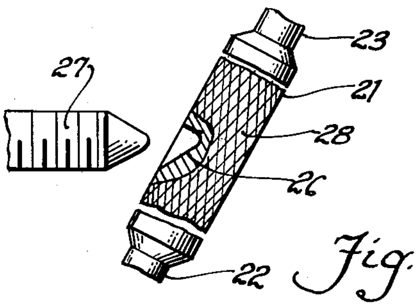
Fig. 2 is a fragmentary view on a larger scale of the stylus shown in Fig. 1.

The stylus 11 comprises a centrally disposed shank 21 and a pair of projecting members 22 and 23, the projecting members terminating respectively in record engaging points 24 and 25. Shank 21 is somewhat thicker than members 22 and 23 in order to form rigid support means, and is provided with a generally conical hole 26 (Fig. 2) for receiving the correspondingly formed end of a screw 27 for holding the stylus to torsion member 17. The axis of hole 26 is substantially the same axis as that of screw 27. Shank 21 may also be provided with a band of color 28 having a prescribed width so that when the stylus is placed in the pickup it will be centered in position approximately when the band of color is no longer visible.

Torsion member 17 extends axially of the pickup and includes a hole 29 extending therethrough at an acute angle. In line with hole 29 there is a pair of holes 31 and 32 formed in casing members 14 and 15 in order that the stylus may be inserted into the pickup. Holes 29, 31 and 32 are of such dimensions that the stylus with its reversely curved members 22 and 23 may be inserted and removed easily.

Since shank 21 lies at an acute angle relative to the axis of torsion member 17, the generally conical hole 26 must be properly disposed or the end of screw 27 will not be correctly received therein. That is to say, with hole 26 formed as shown, the members 22 and 23 in order to have the proper orientation, member 22 must project from the bottom of the pickup and member 23 must project from the top of the pickup. If this orientation is reversed, the end of screw 27 will not fit correspondingly in hole 26 and the stylus wil not project symmetrically from the two sides of the pickup. To indicate when the stylus is properly oriented in the pickup, one of its members, for example member 22, may be colored, knurled, or marked in some other way, to indicate that it should project from the bottom of the pickup.

The stylus may be formed of any suitable material, such for example as steel, and the record engaging points 24 and 25 may be points formed on the end of stylus members 22 and 23 and suitably hardened or these points may comprise any suitable material, such for example as sapphire, attached to the members 22 and 23.

Figures 3, 4:
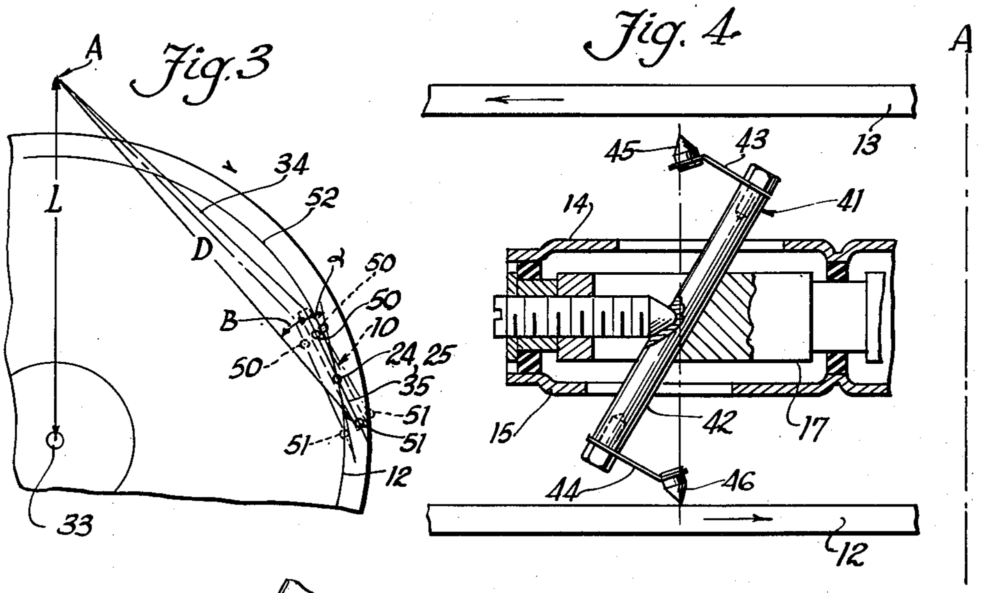
Fig. 3 is a diagrammatic view of phonograph apparatus for explaining the invention.
Fig. 4 is a fragmentary view similar to Fig. 1 of a modified form of the invention.

In Fig. 1 the dot-dash line A represents the pivot axis of the phonograph tone arm, similarly designated in Fig. 3. When using pickup 10 and a stylus having members 18 and 19, stylus member 18 engages record 12 when this record is rotating as shown by the corresponding broken arrow, and stylus member 19 engages record 13 when this record is rotating in the direction shown by the corresponding broken arrow. Stylus member 18 engages the record at a distance from the tone arm pivot axis A designated as $D_1$, and the corresponding distance for stylus member 19 may be designated as distance $D_2$, distance $D_2$ being less than distance $D_1$ by an amount determined by the construction of the stylus and the angle thereof in the torsion member 17.

Referring to Fig. 3, there is schematically shown phonograph apparatus including the record 12 rotatable about a turntable center 33 and a tone arm 34 having a forward portion 35, the tone arm being pivoted at A and adapted to hold pickup 10 (shown dotted) in the forward portion. The distance from pivot axis A to any stylus point may be designated as D (shown in the drawing as extending from A to point 51) and the distance from the axis A to the center of the turntable 33 may be designated as L. In phonograph apparatus of this character the forward portion 35 makes an angle $\beta$ relative to the line D, and the stylus makes an angle with the tangent to a record groove at the point of engagement, which angle, as indicated previously in this specification, is known as the tracking angle and is indicated as the angle $\alpha$.

Member 22 of stylus 11 is bent or curved in the opposite direction from stylus member 18, and member 23 is bent or curved in the opposite direction from stylus member 19. In this manner record engaging points 24 and 25 may be brought into position lying on a line perpendicular to the record surfaces. In constructions where the longitudinal axis of the pickup cartridge is parallel to the record surfaces and the cartridge occupies its normal position in the tone arm, record engaging points 24 and 25 would lie on a line perpendicular to the longitudinal axis of the pickup cartridge. In the construction of Fig. 1 wherein the axis of the torsion member 17 and the pickup cartridge axis substantially coincide, record engaging points 24 and 25 would lie on a line perpendicular to the axis of the torsion member even though shank 21 lies at the same angle in torsion member 17 as the shank of the stylus embodying stylus members 18 and 19. With members 22 and 23 reversely bent as shown, record engaging points 24 and 25 engage records 12 and 13, respectively, at the same distance $D_3$ from the tone arm axis A.

While in the construction shown the pickup cartridge as well as the tone arm are horizontal and substantially parallel to horizontal record surfaces, it is understood that the principles of the invention apply also where the records are rotating in planes other than horizontal, and the axis of the pickup cartridge may have orientations other than parallel to the record surfaces.

In Fig. 3, circles 50 and 51 represent the record engaging points of the stylus members 19 and 18 respectively, and circle 24, 25 represent the record engaging points 24 and 25 of stylus 11. Partial circle 52 represents the initial or starting groove of the top side of record 12 as well as the initial groove on the botom side thereof. Using stylus 11, with its record engaging points 24 and 25 directly above each other, each side of a record is engaged in the starting groove when the automatic record changer is set to place either point 24 or 25 therein. However, if a stylus having members such as 18 and 19 is used and the record changer tone arm is adjusted to place point 51 (shown dotted) in groove 12, the point 50 (shown dotted) engages the record several grooves inwardly thereby missing some of the recording. Likewise, if the tone arm is adjusted so as to place point 50 (shown dotted) in the starting groove 12, point 51 (shown dotted) will be in the margin and may be beyond the guide groove, or if the margin is narrow it may not touch the record at all. Hence constructing stylus 11 so that when placed in a pickup the points 24 and 25 will be substantially directly above each other, the top and bottom sides of records are engaged at substantially the same point relative to the turntable center and thus in the starting groove thereof.

It is well understood by those skilled in this art that by choosing the distance D relative to the distance L in a determinable manner, and by choosing the angle $\beta$ which the forward part 35 of the tone arm makes with the line joining the stylus and the axis A, the optimum point of contact of the stylus and the record may be obtained. The optimum distance D and the angle $\beta$ may be determined under any given set of designing conditions and remain fixed thereafter. Comparing Figs. 1 and 3, and assuming that Fig. 3 shows record 12 rotating in the direction of the dotted arrow and thereby corresponds to record 12 rotating in the direction of the corresponding dotted arrow in Fig. 1, it will be seen that the optimum distance $D_1$ which was determined by design construction is not obtained by stylus member 19 and record 13 inasmuch as distance $D_2$ is less than $D_1$. An optimum distance D having once been determined together with the angle $\beta$ does not vary with the direction of record rotation.

In the original design of a pickup and a stylus member corresponding to stylus 11, the distance $D_3$ may, of course, be made equal to the distance $D_1$, that is, the optimum distance for the particular record size, for example. Then, since distance $D_3$ is the same for record engaging points 24 and 25, the optimum distance is obtained for both. For the stylus 11, record 12 rotates as shown by the solid arrow, that is, opposite to that for stylus member 18, and the record 13 rotates as shown by the solid arrow which also is in the opposite direction to that for stylus member 19.

Referring to Fig. 4, there is shown a modification of the invention embodying a pickup and a double-ended stylus generally corresponding to members of this character in Fig. 1. The stylus 41 of Fig. 4 comprises a rod-like member 42 having stylus members 43 and 44 attached thereto at each end by means of bolts as shown or other suitable means, the stylus members respectively holding record engaging points 45 and 46. The various members of this stylus lie generally in the same plane and stylus holding members 43 and 44 extend in opposite directions from each other as shown. Record engaging points 45 and 46 are angularly held by members 43 and 44 so as to engage the records 13 and 12 at the proper angle. Stylus holding members 43 and 44 are of identical construction and hold points 45 and 46 to lie on a line which passes substantially through the center of rod-like member 42.

The torsion member 17 of this pickup has a slot therethrough in order that the stylus may be inserted into the pickup. This slot is angularly formed so that the rod-like member 42 may rest thereagainst and the rear face of the slot lies at an angle such that points 45 and 46 lie substantially on a line which is perpendicular to the records 12 and 13. Points 45 and 46 need not be in the same plane as shank 42, but may be displaced in the same direction perpendicular to the plane of Fig. 4, in which case the result of the invention may be accomplished by having points 45 and 46 lie on a line perpendicular to records 12 and 13. The hole through torsion member 17 is larger and of a somewhat different shape than the hole through torsion member 17 of Fig. 1 inasmuch as the different construction of the stylus makes a different hole necessary in order to be able to easily insert and remove the stylus. Similarly, the two holes in the top and bottom halves 14 and 15 of the housing are larger in the embodiment of Fig. 4 than in the embodiment of Fig. 1.

The members 43 and 44 may be vertically compliant in order that some vertical movements of the pickup may occur without injury to record engaging points 45 and 46 and without causing distortion during record reproduction.

Record engaging points 45 and 46 may be made of any suitable material such as hardened steel or sapphire, for example.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described the invention, what is claimed and desired to be secured by Letters Patent is:

1. A double ended stylus for disposition in a phonograph record reproducing pickup having a chuck and a clamping member comprising, a shank portion adapted to lie at a substantial angle in such chuck, a record engaging portion including a record engaging tip at each end of said shank portion, said record engaging portions being reversely directed whereby said record engaging tips are disposed so as to lie along a line perpendicular to the record in the normal playing position thereof, said shank and said record engaging portions being a unitary combination receivable as such in the chuck of such pickup, a recess on said shank portion for receiving the end of such clamping member, the axis of said recess lying in the plane determined by said shank portion and said record engaging portions, said recess having upper and lower wall surfaces for engagement with the end of such clamping member to position said stylus transversely of such pickup and having side wall surfaces for engagement with the end of such clamping member to position said stylus rotationally in such pickup.

2. A double ended stylus for disposition in a phonograph record reproducing pickup having a chuck and a clamping member comprising, a shank portion adapted to lie at a substantial angle in such chuck, a record engaging portion including a record engaging tip at each end of said shank portion, said record engaging portions being reversely directed whereby said record engaging tips are disposed so as to lie along a line perpendicular to the record in the normal playing position thereof, said shank and said record engaging portions being a unitary combination receivable as such in the chuck of such pickup, a recess on said shank portion for receiving the end of such clamping member, the axis of said recess lying in the plane determined by said shank portions and said record engaging portions, said recess having upper and lower wall surfaces for engagement with the end of such clamping member to position said stylus transversely of such pickup and having side wall surfaces for engagement with the end of such clamping member to position said stylus rotationally in such pickup, one of said record engaging portions including indicia for indicating the orientation of said stylus in such pickup.

ELMER V. CARLSON.

REFERENCES CITED

The following references are of record in the file of this patent:

UNITED STATES PATENTS

| Number | Name | Date |
|---|---|---|
| 1,775,510 | Caputo | Sept. 9, 1930 |
| 1,992,893 | Thomas | Feb. 26, 1935 |
| 2,318,654 | Wissner | May 11, 1943 |
| 2,479,894 | Andrews | Aug. 23, 1949 |
| 2,526,188 | Andres | Oct. 17, 1950 |

FOREIGN PATENTS

| Number | Country | Date |
|---|---|---|
| 457,186 | France | Sept. 13, 1913 |
| 590,176 | Great Britain | July 10, 1947 |